United States Patent Office 2,867,600
Patented Jan. 6, 1959

2,867,600

SYNTHETIC RESINOUS COMPOSITION, PROCESS OF IMPREGNATING THEREWITH AND PRODUCT THEREOF

Alexander Coutras, South Norwalk, Conn., assignor to American Cyanamid Company, New York, N. Y., a corporation of Maine No Drawing. Application October 1, 1954
Serial No. 459,830

8 Claims. (Cl. 260—39)

This invention relates to thermosetting resinous compositions. More particularly, this invention relates to thermosetting resinous compositions which find employment as laminating syrups and to the laminates made therefrom.

The production of laminated articles utilizing thermosetting resinous syrups is well known. In the production of the laminates it is customary to impregnate a base member with a laminating syrup as, for example, by dipping or continuously passing the base member through the resinous syrup. After the base member has been impregnated with the syrup, it is usually dried to remove excess volatiles therefrom. A plurality of the resin impregnated base members is then stacked together and cured under heat and pressure to form the laminated article. The employment of an alkyd modified benzoguanamine-formaldehyde resin as a laminating syrup is particularly desirable inasmuch as enhanced physical properties of the laminated articles are realized. However, this particular resin has presented certain processing difficulties, especially in the drying of the resin impregnated base member to remove volatiles therefrom, so that extensive commercialization of this resin has not been realized. Previously, when the alkyd modified benzoguanamine-formaldehyde resin was used to impregnate base members for the production of laminates, it was found that the resin had a tendency to flake or powder during handling after the drying operation. In the event that the resin flaked, the treated or impregnated sheets could not be handled except with extreme care without loss of the resin from the base member. Also, the flaked or powdered resin resulted in dust being formed that was unhealthful to breathe. I have now found that addition of a small but effective amount of silica gel to the alkyd modified benzoguanamine-formaldehyde resin alleviates this flaking problem during the removal of the volatiles and during the drying of the resin impregnated base member.

It is therefore an object of my invention to prepare novel thermosetting resinous laminating syrups. It is a further object of my invention to prepare an alkyd modified benzoguanamine-formaldehyde resinous laminating syrup that may be dried prior to the production of laminates therefrom which will not flake. These and other objects of my invention will be discussed more fully hereinbelow.

The benzoguanamine-aldehyde resins utilized in the preparation of the compositions of the present invention may be prepared by reacting benzoguanamine with an aldehyde such as formaldehyde, acetaldehyde, benzaldehyde, furfural or the like. The molar ratio of the benzoguanamine to the aldehyde may be varied over a fairly wide range, for example, mol ratios of 1:0.5 to 1:4, respectively, but preferably those which have mol ratios of 1:2 to 1:3, respectively. The alkyd resin utilized may be one which is oil free or it may be what is commonly referred to as a short-oil modified alkyd, e. g., one containing not more than 25% oil based on the total weight of the alkyd resin; a medium-oil alkyd which is defined as an alkyd resin which has been modified by 26% to 50% oil; or a long-oil alkyd which is generally defined as an alkyd resin which is modified by 51% to 80% of oil. The alkyd resins which may be used in accordance with the teaching of my invention are those which are conveniently prepared by use of a polycarboxylic acid and a polyhydric alcohol in which the acid may be a saturated acid or an ethylenically unsaturated acid but preferably those which are saturated.

In the preparation of the alkyd resin one may modify the resin by use of oils or oil acids of the drying, semi-drying or nondrying classes, although it is actually preferred that the semidrying or nondrying oils be used. There is little overall advantage to be derived in using the drying oils exclusively although they may be used if desired. If the amount of oil used to modify the alkyd resin is decreased, particularly when the range of proportions comes within the limits of that set forth above and defined as short-oil alkyd resins, the necessity for the use of a stronger solvent in the preparation of the laminating syrup becomes more pronounced.

The alkyd resins may be prepared by the use of saturated polycarboxylic acids or the ethylenically unsaturated polycarboxylic acids. Among the saturated polycarboxylic acids that may be used in the practice of the present invention are oxalic, malonic, succinic, glutaric, sebacic, adipic, pimelic, suberic, azelaic, tricarballylic, citric and tartaric. Phthalic acid and terephthalic acid may also be used in the preparation of the alkyd resin in the same proportions as the saturated polycarboxylic acids. Additionally, one may use such ethylenically unsaturated acids as maleic, fumaric, itaconic, citraconic and the like. These acids and other compatible acids, their esters and their anhydrides may be used in the preparation of the alkyd resins. Obviously, these acids may be used either singularly or in combination with one another.

Conventional polyhydric alcohols that may be used in the preparation of the alkyd resins are such as ethylene glycol, diethylene glycol, trimethylene glycol, tetramethylene glycol, pinacol, trimethylol propane, trimethylol ethane, mannitol, dulcitol, sorbitol, glycerol, pentaerythritol, dipentaerythritol and the like. The polyhydric alcohols may be used either singularly or in combination with one another in the esterification reaction in the preparation of the alkyd resin.

The esterification reaction between the polycarboxylic acid and the polyhydric alcohol in the formation of the alkyd resin may be carried out by using equimolecular proportions of the polyhydric alcohol with the polycarboxylic acid. There are instances, however, in which it is desired to use as much as 50% in excess of the amount of polyhydric alcohol of that theoretically required to esterify completely the polycarboxylic acid. An excess of alcohol in the reaction mixture is desirable in order to produce a comparatively low acid number in the esterification product in a reasonably short time.

Oils that may be employed in the preparation of the oil modified alkyds to be used in the present invention are such as castor oil, linseed oil, chaulmoogra oil, cherry kernel oil, corn oil, hemp seed oil, grape seed oil, hazelnut oil, candlenut oil, lard oil, soya oil, coconut oil cottonseed oil, olive oil, peach kernel oil, pistachio nut oil, rape seed oil and the like.

The condensation reaction for the preparation of the benzoguanamine-aldehyde resin employed in the present invention may be carried out at elevated temperatures and under subatmospheric, atmospheric or superatmospheric pressure. The reaction may be carried out under a neutral, alkaline or acidic pH. It is preferred that the reaction not be carried out under strongly acid conditions but rather at a neutral or slightly alkaline pH. Any acidic or alkaline ingredient, as will be apparent to those skilled in the art, may be utilized in order to obtain the desired reaction pH.

The following examples are given by way of illustration and not limitation except as indicated in the appended claims so that those skilled in the art may more fully understand the inventive concept herein presented. All parts are parts by weight.

Example 1

115 parts of glycerin, 185 parts of phthalic acid anhydride and 60 parts of dehydrated castor oil acids are introduced into a suitable reaction vessel and heated to about 350° F. in a three hour period. The mixture is then heated gradually to 400° F. in an additional period of about one to one and one-half hours. The batch is then held at this temperature until an acid number of 40 or less is obtained, after which time the batch is cooled to about 275° F. to 300° F. The batch may then be diluted with a suitable solvent such as Cellosolve to a 50% solids content.

Example 2

148 parts of phthalic acid anhydride, 100 parts of glycerin and 150 parts of soya oil fatty acids are introduced into a suitable reaction vessel and heated gradually to about 425° F. in a three hour period. The mixture is held at this temperature until an acid number of about 10 to 20 is reached. A solvent such as toluene is then added in a sufficient amount to adjust the solids content to about 50% and the solution agitated at about 250° F. until it becomes completely clear.

Example 3

18.7 parts of benzoguanamine and 16.2 parts of a 37% aqueous formaldehyde solution are charged into a suitable reaction vessel equipped with means for reflux. 0.06 part of the sodium hydroxide is added to give a slurry pH of 7.9. The reaction mixture is heated to reflux in 15 minutes and held at reflux, 94° C., for 3 hours and 35 minutes. At this point the solution becomes turbid and hydrophobic. The remaining 0.04 part of sodium hydroxide is then added to adjust the pH of the mixture to 8.1 and the temperature is lowered to 71° C. The reaction mass is then vacuum concentrated at 240 millimeters mercury pressure until the batch temperature reaches 120° C. where it held for 10 minutes. The resin is dumped onto trays and cooled to obtain a clear, dry, brittle resin which is ground to between about 60-mesh and 200-mesh fineness. The resin is infinitely dilutable in benzene-denatured, anhydrous ethanol. A 50% solution of this resin in ethanol is stable at 20° C. to 25° C. for more than 5 hours.

In the preparation of the thermosetting resinous laminating syrup, it is conventional to use an organic solvent for the resin mixture. Among the solvents which may be used are acetone, butyl acetate, butyl carbitol, isobutyl ketone, dioxane, ethylene glycol, ethyl lactate, ethyl acrylate, ethyl acetate, isophorone, methylethyl ketone, methylisobutyl ketone, styrene, tetrachloroethylene, xylene, other aliphatic hydrocarbon solvents and the like. The amount of solvent which may be used can be varied considerably from no solvent up to about 200% solvent, based on the total weight of the resin solids.

Example 4

148 parts of phthalic anhydride, 98 parts of lauric acid and 98 parts of glycerol are heated to 430° F. and held at that temperature until a viscosity of about F–G at 50% resin solids in toluene is obtained. The viscosity measurement is made on the Gardner-Holdt scale at 25° C. The resinous composition having the specified viscosity is then diluted with Cellosolve, which is a commercial ethyl ether alcohol solvent, to 60% resin solids.

Example 5

A thermosetting resinous laminating syrup is prepared by blending 70 parts of the benzoguanamine-formaldehyde resin prepared in accordance with Example 3 with 30 parts of the alkyd resin prepared in accordance with Example 4. 50 parts of a 80:20 ethanol-Cellosolve mixture as a solvent are present. To this mixture is added one part by weight of a silica aerogel having a particle size of from 3 to 5 microns diameter. Into a second sample are introduced 5 parts of a silica aerogel having a particle size of 3 to 5 microns diameter. Cellulosic laminating overlay papers are then impregnated with the syrups to a resin content of 70% by weight. The impregnated sheets are dried in an oven to a volatile content of less than 5% by weight. Each of the sheets, after drying, is flexible and no flaking of the resin is apparent. The dried sheets are nonblocking and may be stacked prior to use. In order to form a laminate, a plurality of the resin impregnated sheets is stacked together and cured under heat and pressure. When a similar resin impregnated sheet is prepared, except that no silica gel is present, the resin flakes during handling after the drying operation.

Example 6

To the resinous laminating syrup above prepared is added silica gel in the amount of from 0.2 to 1.0 part by weight. This amount of silica gel is effective in alleviating the flaking problem during the drying of the resin impregnated cellulosic sheet.

Example 7

One part by weight of a silica aerogel having a particle size of 1 to 3 microns is added to the thermosetting resinous laminating syrup. A pronounced improvement in the flaking problem is observed during the drying of the resin impregnated cellulosic sheet.

The silica gel that may be employed in accordance with my invention to alleviate the flaking problem realized during the drying of the resin impregnated base member may be either the gelatinous precipitates or the aerogels. The production of the silica gels and aerogels is well known in the art. As used herein, silica gel means both forms of the above-defined gel. The particle size of the gel utilized may be within the range of from 1 to 100 microns, preferably from 3 to 40 microns, and may be used in an amount of from 0.5% to 10% by weight, based on the total resin solids present. It is preferred however, that the amount of silica gel employed be within the range of from 1% to about .5% by weight, based on the total resin solids present.

The alkyd modified benzoguanamine-formaldehyde resin herein employed must contain at least 60% by weight of the benzoguanamine-formaldehyde resin. It is preferred that the weight percentage of the benzoguanamine-formaldehyde resin be within the range of from 65% to 75%. When the amount of benzoguanamine-formaldehyde resin is less than 60% by weight, the flaking problem is not present. However, those resins do not have the enhanced physical properties of the resinous compositions of my invention.

Generally, the laminating syrup of the present invention is used to impregnate alpha-cellulose or cellulosic laminating sheets which are employed in the production of laminating articles by combining a plurality of the resin impregnated laminating sheets and curing the same under heat and pressure. The particular laminating sheet employed and its ultimate use will depend upon the amount of resin employed to impregnate said sheet. For example, a decorative overlay sheet having a thickness of about 2 to 5 mils will contain from about 60% to about 75% by weight of resin content. On the other hand, print paper, which may be pigmented, has a thickness of about 8 to 12 mils and is impregnated with the resin to the extent of about 35% to 55% by weight, preferably about 40% to 50% by weight. Obviously, other base materials such as glass cloth; asbestos cloth; textile web such as cotton, wool or rayon fabrics; or the like may be impregnated with the present laminating syrup. As previously indicated, impregnation of the base member may be carried out by such methods as dipping, roll coating, spraying or the like. The resin impregnated base member may be conveniently dried in an oven or by infrared heating means at temperatures varying from 215° F. to 300° F. in periods varying from 5 to 15 minutes. The particular drying means employed will of course determine the optimum drying time for each operation. The volatile content of the resin impregnated base member removed from the drying operation should be less than about 6% by weight and preferably in the range of from 3% to 4% by weight. In certain instances it is desirable to lower the volatile content to as little as 0.5% by weight. However, extreme drying conditions are required to obtain such a low volatile content in the laminating member.

The laminating sheets prepared in accordance with the present invention are flexible and the handling of the treated sheet is facilitated inasmuch as no flaking of the resin occurs. A plurality of the resin impregnated members may be stacked and cured under conventional heat and pressure. If desired, the laminated article prepared may utilize members all of which are impregnated with the present laminating syrup or, alternatively, the resin impregnated laminating sheets may be used to cover a core of laminating sheets impregnated with other resinous compositions.

I claim:

1. A resinous composition which comprises from about 65 to 75 parts of a benzoguanamine-formaldehyde resin, from about 35 to 25 parts of an alkyd resin, about 1% to about 5% by weight of silica gel, based on the total weight of the resin solids, and a solvent.

2. A resinous composition which comprises from about 65 to 75 parts of a benzoguanamine-formaldehyde resin, from about 35 to 25 parts of an alkyd resin, about 0.5% to about 10% by weight of silica gel, based on the total weight of the resin solids, and a solvent.

3. The process for preparing a laminating sheet which comprises impregnating said sheet with a resinous composition comprising from about 65 to 75 parts of a benzoguanamine-formaldehyde resin, from about 35 to 25 parts of an alkyd resin, about 1% to about 5% by weight of silica gel, based on the total weight of the resin solids, and a solvent, and drying said resin impregnated sheet to remove the volatile material therefrom.

4. The resin impregnated laminating sheet prepared in accordance with claim 3.

5. The process for preparing a laminating sheet which comprises impregnating said sheet with a resinous composition comprising from about 65 to 75 parts of a benzoguanamine-formaldehyde resin, from about 35 to 25 parts of an alkyd resin, about 0.5% to about 10% by weight of silica gel, based on the total weight of the resin solids, and a solvent, and drying said resin impregnated sheet to remove the volatile material therefrom.

6. The resin impregnated laminating sheet prepared in accordance with claim 5.

7. A resinous composition which comprises at least 60% by weight of a benzoguanamine-aldehyde resin and correspondingly up to 40% by weight of an alkyd resin, said composition containing as an anti-flaking agent from about 1% to 5% of silica gel based on the total weight of resin solids.

8. A resinous composition which comprises at least 60% by weight of a benzoguanamine-formaldehyde resin and correspondingly up to 40% by weight of an alkyd resin, said composition containing as an anti-flaking agent from about 0.5% to 10% silica gel based on the total weight of resin solids.

References Cited in the file of this patent

UNITED STATES PATENTS

| 2,377,867 | D'Alelio | June 12, 1945 |
| 2,451,410 | Queeny | Oct. 12, 1948 |

FOREIGN PATENTS

| 104,382 | Australia | Feb. 12, 1937 |